(12) United States Patent
Hsiung

(10) Patent No.: US 6,481,322 B1
(45) Date of Patent: Nov. 19, 2002

(54) SAWING APPARATUS COMBINED WITH MARKING DEVICE

(75) Inventor: Bear Hsiung, Taipei (TW)

(73) Assignee: Limate Corporation, Taipei (TW)

( * ) Notice: Subject to any disclaimer, the term of this patent is extended or adjusted under 35 U.S.C. 154(b) by 0 days.

(21) Appl. No.: 09/481,931

(22) Filed: Jan. 13, 2000

(51) Int. Cl.[7] ............................. B26D 7/27; B27B 5/20; B27B 5/29
(52) U.S. Cl. .......................... 83/521; 83/520; 83/471.3; 83/490; 362/89
(58) Field of Search ........................ 83/522.15, 522.16, 83/520, 521, 471.3, 490; 362/89, 90, 285, 287, 289

(56) References Cited

U.S. PATENT DOCUMENTS

| | | | | |
|---|---|---|---|---|
| 2,510,471 A | * | 6/1950 | Horstkotte | 83/522.15 X |
| 2,806,492 A | * | 9/1957 | Becker | 83/522.15 X |
| 3,496,814 A | * | 2/1970 | Bessim | 83/522.15 X |
| 4,257,297 A | * | 3/1981 | Nidbella | 83/522.15 X |
| 4,468,993 A | * | 9/1984 | McCown et al. | 83/522.15 X |
| 4,503,740 A | * | 3/1985 | Brand et al. | 83/522.15 X |
| 5,546,840 A | * | 8/1996 | Supe-Dienes | 83/522.15 X |
| 5,996,460 A | * | 12/1999 | Waite | 83/522.15 X |

* cited by examiner

Primary Examiner—Clark F. Dexter
(74) Attorney, Agent, or Firm—Rosenberg, Klein & Lee

(57) ABSTRACT

A marking device is provided for sawing apparatus having a sawing blade and a blade rack behind the sawing blade and supporting the sawing blade. The marking device comprises a fixing frame arranged on the blade rack, a marker arranged within the fixing frame and having a light source therein, a cylinder lens arranged on the fixing frame. A light emitted from the light source and passing through the cylinder lens forms a straight cutting indication line projecting on an article to be cut. The power of the marker and the trigger of the sawing blade can be simultaneously or independently turned on.

2 Claims, 4 Drawing Sheets

SAWING APPARATUS COMBINED WITH MARKING DEVICE

FIELD OF THE INVENTION

The present invention relates to a marking device for sawing apparatus, especially to a marking device mounted on a sawing apparatus to display a segment of sawing indication line.

BACKGROUND OF THE INVENTION

The conventional sawing apparatus can be classified to circular saw and jig saw. The jig saw can only perform longitudinal cutting jobs for articles such as wooden material. The circular saw, after many-year developments, can perform both longitudinal cutting and skew cutting. The longitudinal cutting job can be guided by the marker on both sides of the article to be cut, thus performing precise cutting. The cutting wheel of the circular saw is lower to the article to be cut at the same time when the feed handle is operated to start the sawing blade. However, the skew cutting is more difficult to handle, especially for cutting circular articles. The problem is generally solved by two ways. The sawing blade is firstly not started and lowered down to align with the cutting position. Afterward, the feed handle of the sawing blade is released to perform actual cutting. Otherwise, the sawing blade directly performs pre-cutting and the material is wasted when the pre-cutting is not correctly performed. The above two approaches are both time and labor consuming, especially when great amounts of articles are to be cut.

It is the object of the present invention to provide a marking device for sawing apparatus, wherein a marker emitting a straight cutting indication line projecting on an article to be cut. The straight cutting indication line can facilitate the sawing of a circular article and the calibration of a replaced blade.

To achieve the above object, the present invention provides a marking device for sawing apparatus having a sawing blade and a blade rack behind the sawing blade and supporting the sawing blade. The marking device comprises a fixing frame arranged on the blade rack, a marker arranged within the fixing frame and having a light source therein, a cylinder lens arranged on the fixing frame. A light emitted from the light source and passing through the cylinder lens to forms a straight cutting indication line projecting on an article to be cut. The power of the marker and the trigger of the sawing blade can be simultaneously or independently turned on.

The various objects and advantages of the present invention will be more readily understood from the following detailed description when read in conjunction with the appended drawing, in which:

DETAILED DESCRIPTION OF THE PREFERRED EMBODIMENT

Figure 1:
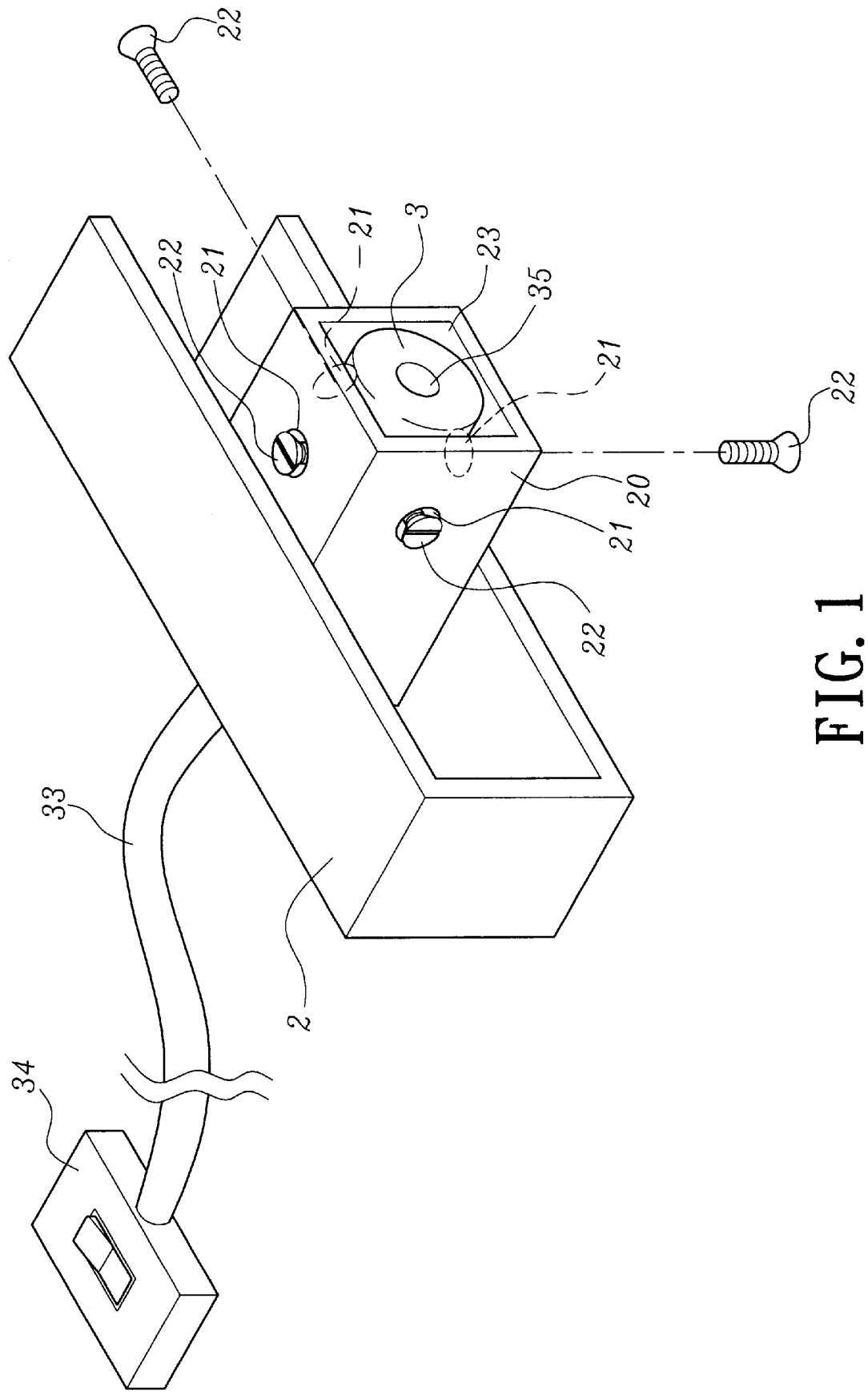
FIG. 1 is a perspective view of the present invention.
Figure 2:
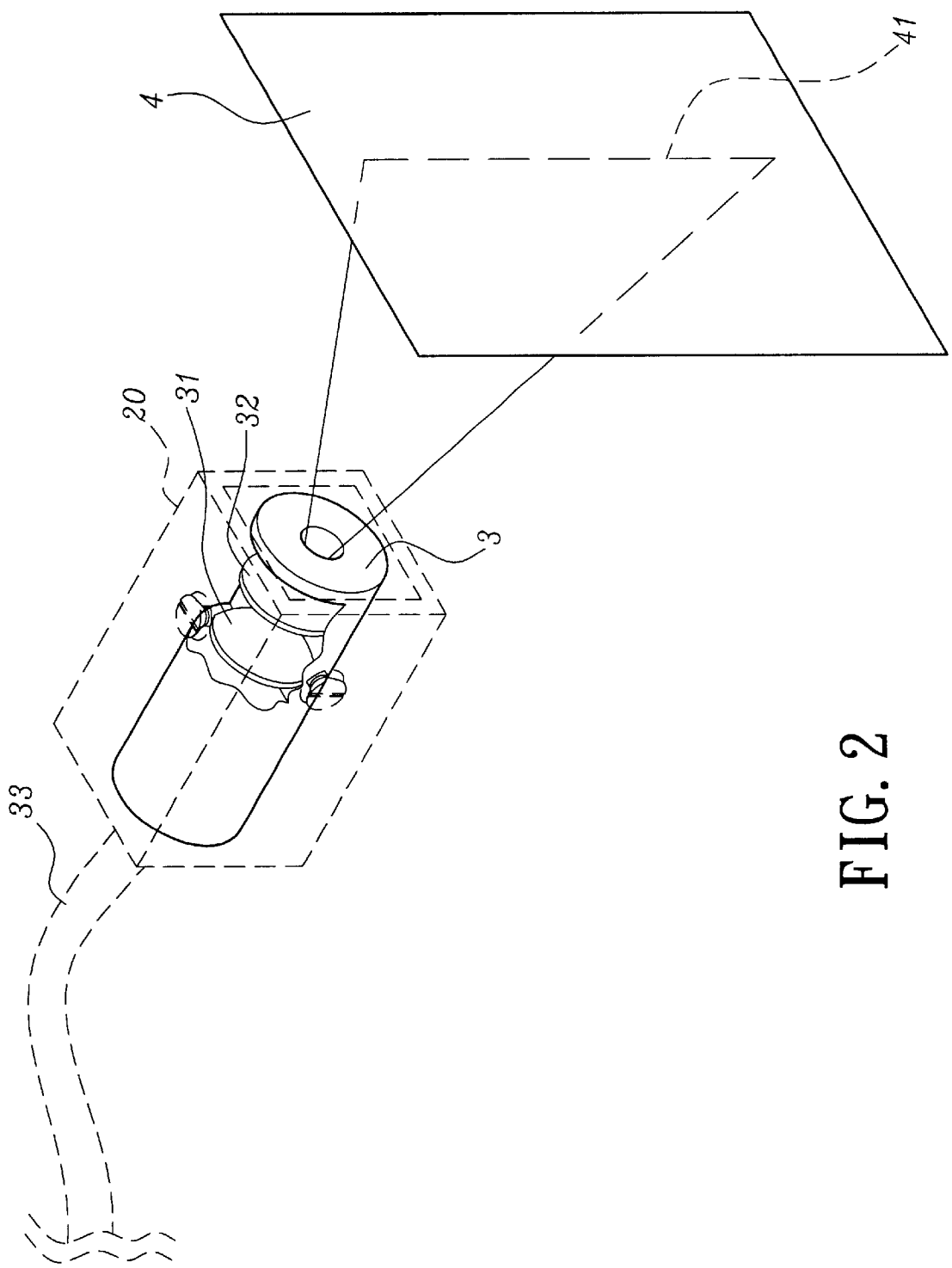
FIG. 2 is another perspective view of the present invention.
Figure 3:
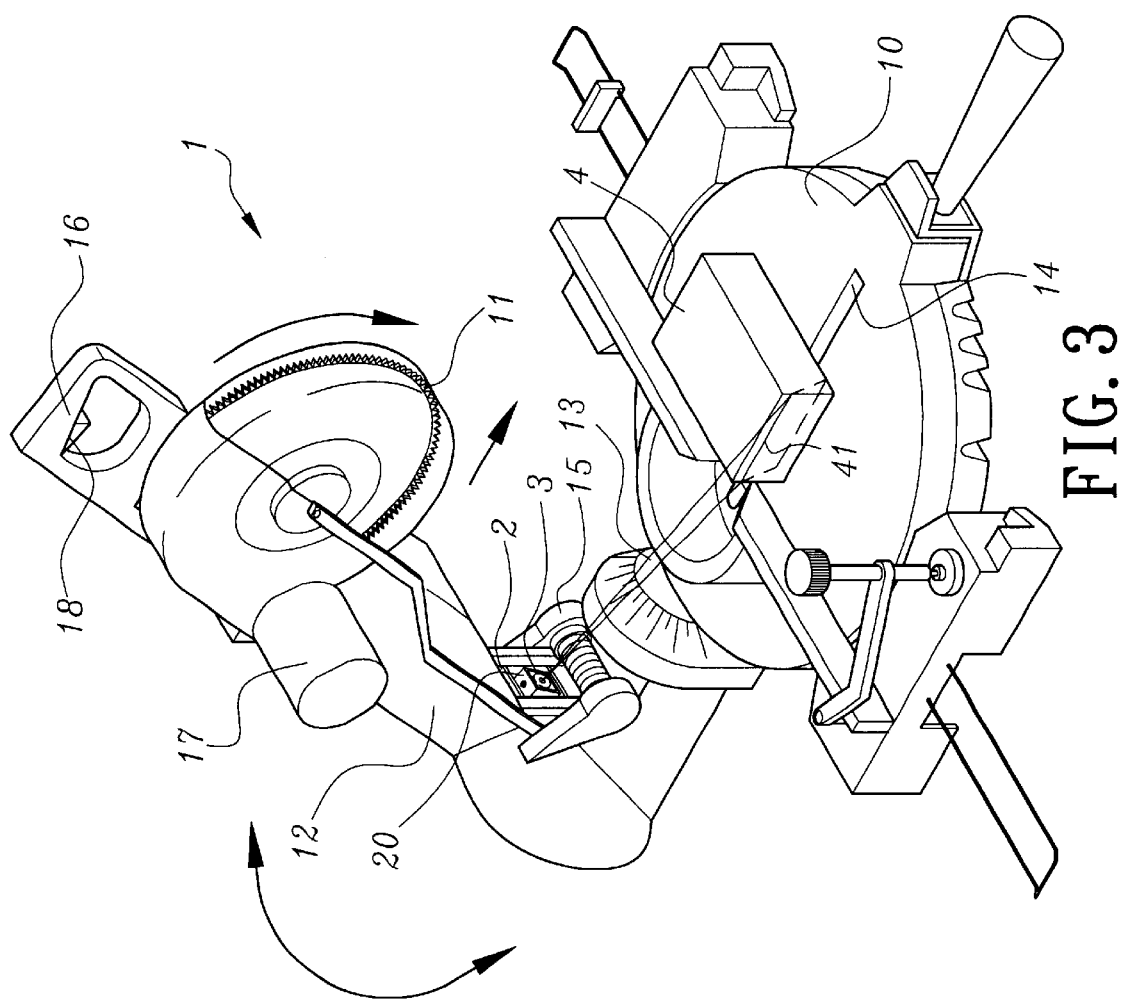
FIG. 3 shows the application of the present invention.
Figure 4B:
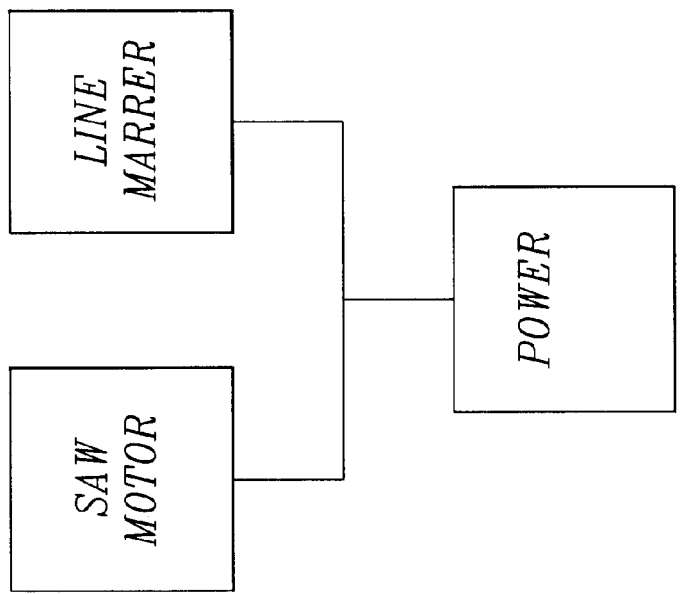
FIG. 4a is a schematic block diagram illustrating the power source coupling in accordance with one embodiment of the present invention; and, FIG. 4b is a schematic block diagram illustrating the power source coupling in accordance with another embodiment of the present invention.
Figure 4A:
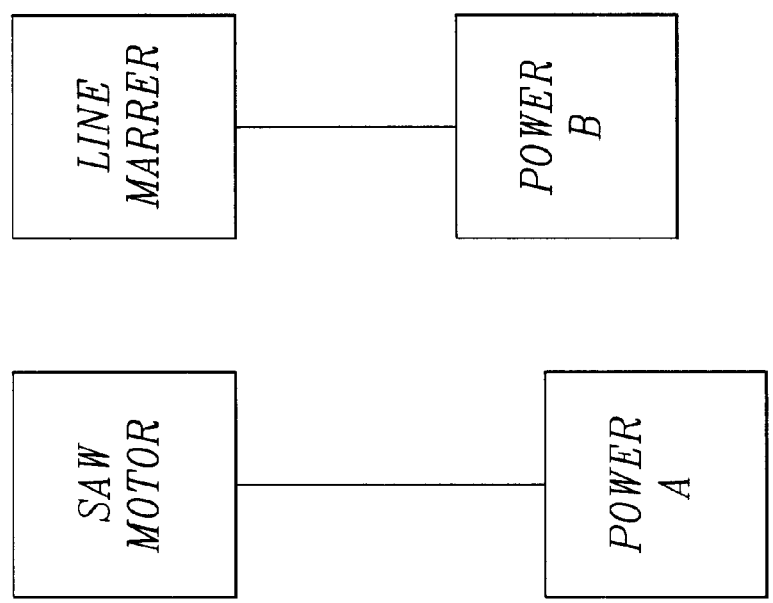

FIGS. 1 to 3 shows the marking device for sawing apparatus according to the present invention. The sawing apparatus 1 has a sawing blade 11, a blade rack 12 behind the sawing blade 11 and a fixing frame 2 on the blade rack 12. The sawing apparatus 1 is a miter sawing apparatus and has a supporting stage 10 to support the article 4 to be cut thereon. The sawing apparatus 1 further comprises clamping means to clamp the article 4 to be cut. The clamping way for longitudinal cutting and skew cutting are the same. However, the saw moving direction is crucial wherein the sawing blade 11 should be fallen into a receiving groove 14. The sawing blade 11 is rotated by a spindle 13 on rear side of the supporting stage 10 and is pivotally arranged on a swing center 15 atop the spindle 13. The sawing blade 11 is operated by a handle 16 to swing with respect to the swing center 15 to the top of the supporting stage 10 for performing cutting. Therefore, the blade rack 12, the handle 16 and the sawing blade 11 are coaxially rotated. The sawing blade 11 is driven by a motor 17.

The fixing frame 2 is of a U-shape and arranged atop the swing center of the blade rack 12. The fixing frame 2 is provided with a straight-line marker 3 and clamps a rectangular case 20 therein. The rectangular case 20 is fixed to the blade rack 12 on the inner end thereof. The rectangular case 20 further comprises a hole 23 on an outer end thereof to expose a distal end of the straight-line marker 3 or a light ray. The rectangular case 20 has four thread holes 21 on four lateral sides thereof. The position of the straight-line marker 3 within the rectangular case 20 can be adjusted by four set screws 22 screwed into the thread holes 21. The straight-line marker 3 is provided with a light source 31 and a cylinder lens 32. The light emitted from the light source 31 passes through the cylinder lens 32 and through an aperture 35 to form a straight cutting indication line 41 projecting on the article to be cut, thus facilitating the alignment of the skew cutting operation. The power of the straight-line market 3 and the trigger switch 18 of the handle 16 of the sawing apparatus 1 are simultaneously turned on. In other word, the straight-line marker 3 emits the straight cutting indication line 41 at the same time as the sawing blade 11 of the sawing apparatus 1 is triggered, until the saw operation is finished. However, the calibration of the straight-line marker 3 is hard to perform in this operation mode. Alternatively, the power of the straight-line marker 3 can be independently arranged. More particularly, the straight-line marker 3 uses a battery or another power source 33 (can be ordinary power source) independent of the power of the sawing blade 11. The straight-line marker 3 further comprises an independent control switch 34 to control the operation thereof. Moreover, the straight-line marker is a red-light marker 3.

To sum up, the marking device for sawing apparatus according to the present invention can provide a straight cutting indication line projecting on the article to be cut, thus facilitating the alignment of the skew cutting operation.

Although the present invention has been described with reference to the preferred embodiment thereof, it will be understood that the invention is not limited to the details thereof. Various substitutions and modifications have suggested in the foregoing description, and others will occur to those of ordinary skill in the art. Therefore, all such substitutions and modifications are intended to be embraced within the scope of the invention as defined in the appended claims.

I claim:

1. A sawing apparatus combined with a marking device comprising:
   a) a sawing apparatus, said sawing apparatus including:
      a supporting stage for supporting an article to be cut;
      a spindle rotatably coupled to a rear side of said supporting stage;
      a blade rack having an inner end and an outer end;
      the inner end of said blade rack pivotally coupled to said spindle at a swing center, said blade rack having a handle mounted thereto;
      a motor connected to a first power source and mounted to said blade rack; and,
      a saw blade rotatably coupled to said motor and disposed at the outer end of said blade rack; and
   b) a marking device, said marking device including:
      a fixing frame mounted atop said swing center at the inner end of said blade rack;
      a rectangular case clamped within said fixing frame, said rectangular case having a threaded hole formed in each of four sides thereof and four set screws respectively engaged therein; and,
      a marker connected to a second power source and disposed within said rectangular case and having a plurality of surface portions each in contact with a respective one of said four set screws, wherein said marker is displaceable in each of two orthogonal directions relative to said rectangular case by rotation of respective opposing pairs of said set screws, said marker including a light source for emission of red light, a cylindrical lens aligned with said light source, and an aperture through said marker aligned with said cylindrical lens, wherein said red light is formed into a straight cutting line on a work piece to be cut disposed on said supporting stage.

2. A sawing apparatus combined with a marking device comprising:
   a) a sawing apparatus, said sawing apparatus including:
      a supporting stage for supporting an article to be cut;
      a spindle rotatably coupled to a rear side of said supporting stage;
      a blade rack having an inner and an outer end;
      the inner end of said blade rack pivotally coupled to said spindle at a swing center, said blade rack having a handle mounted thereto;
      a motor connected to a power source and mounted to said blade rack; and,
      a saw blade rotatably coupled to said motor and disposed at the outer end of said blade rack; and
   b) a marking device, said marking device including:
      a fixing frame mounted atop said swing center at the inner end of said blade rack;
      rectangular case clamped within said fixing frame, said rectangular case having a threaded hole formed in each of four sides thereof and four set screws respectively engaged therein; and,
      a marker connected to said power source and disposed within said rectangular case and having a plurality of surface portions each in contact with a respective one of said four set screws, wherein said marker is displaceable in each of two orthogonal directions relative to said rectangular case by rotation of respective opposing pairs of said set screws, said marker including a light source for emission of red light, a cylindrical lens aligned with said light source, and an aperture through said marker aligned with said cylindrical lens, wherein said red light is formed into a straight cutting line on a work piece to be cut disposed on said supporting stage.

* * * * *